(12) United States Patent
Wu

(10) Patent No.: US 6,332,240 B1
(45) Date of Patent: Dec. 25, 2001

(54) WHEEL ASSEMBLY FOR A BABY WALKER OR STROLLER

(76) Inventor: Tsai Mei Wu, No. 67, Cheng Kung Road, Hsueh Chia Town, Tainan Hsien (TW)

( * ) Notice: Subject to any disclaimer, the term of this patent is extended or adjusted under 35 U.S.C. 154(b) by 0 days.

(21) Appl. No.: 09/368,138

(22) Filed: Aug. 5, 1999

(51) Int. Cl.⁷ .................................................. A47B 91/00
(52) U.S. Cl. ........................................ 16/18 CG; 16/18 B
(58) Field of Search .............................. 16/18 CG, 18 B, 16/45, 20, 42 T

(56) References Cited

U.S. PATENT DOCUMENTS

| | | | | |
|---|---|---|---|---|
| 2,981,969 | * | 5/1961 | Fontana .................................. | 16/18 B |
| 3,184,783 | * | 5/1965 | Brigham ............................. | 16/18 CG |
| 3,345,675 | * | 10/1967 | Haydock ............................. | 16/18 CG |
| 3,858,271 | * | 1/1975 | Howard .................................... | 16/45 |
| 5,068,943 | * | 12/1991 | Estkowski ............................ | 16/18 A |

\* cited by examiner

Primary Examiner—Anthony Knight
Assistant Examiner—Mark Williams
(74) Attorney, Agent, or Firm—Rosenberg, Klein & Lee

(57) ABSTRACT

A wheel assembly includes a connecting member connected to a frame of a baby walker or stroller, thereby allowing the upper shield to rotate relative to the frame. The upper shield further includes two opposite walls defining an upper compartment therebetween, the opposite walls including a pair of aligned axle receiving holes. A lower shield is connected to the upper shield and includes a lower compartment that aligns with the upper compartment. A wheel is rotatably received in the upper compartment and a lower compartment and has a lower end extended beyond the lower compartment. An axle is extended through an axle hole of the wheel and the axle receiving holes of the upper shield. The upper shield and the lower shield cover the axle hole of the wheel and the axle to prevent entrance of alien objects.

4 Claims, 9 Drawing Sheets

WHEEL ASSEMBLY FOR A BABY WALKER OR STROLLER

BACKGROUND OF THE INVENTION

1. Field of the Invention

The present invention relates to a wheel assembly for a child's wheeled gear (e.g., a baby walker or stroller) with improved smooth rotation, safety, and aesthetically pleasing effect.

2. Description of the Related Art

FIG. 10 of the drawings illustrates a conventional wheel assembly for a baby walker or stroller. The wheel assembly includes a wheel seat 1' having a hub 121' and a tube 11' formed on a side thereof and connected to the hub 121' via ribs 12'. A tubular connecting member 3' is mounted around the tube 11' and a connecting post 2' is extended through a longitudinal hole 31' of the tubular connecting member 3'. The tubular connecting member 3' further includes outer threading 32' for engaging with a frame of the baby walker or stroller. Thus, the wheel seat 1' is rotatable through 360° relative to the frame of the baby walker or stroller. Two wheels 4' are mounted on both sides of the hub 121' and an axle 5' is extended through the hub 121' and axle holes 41' of the wheels 41.

It is, however, found that dust and/or alien objects tend to enter the exposed axle holes 41' of this wheel assembly such that friction to the axle 5' is increased. As a result, the wheels 4' may not rotate smoothly. The exposed ends of the axle 5' adversely affect the aesthetically pleasing effect. In addition, referring to FIG. 11, the wheels 4' are not shielded such that the wheels 4' cannot be stopped by objects having a height lower than a radius of the wheel 4'. More specifically, it is possible for the child in the baby walker or stroller to move to a dangerous place and thus gets hurt if adult is not aware of the situation. If obstacles are provided to avoid such situation, walking inconvenience to adults is incurred. Furthermore, the baby or child may reach his/her fingers or toes into a space "A" (FIG. 12) between the wheels 4' and thus be injured.

FIG. 13 of the drawings illustrates another conventional wheel assembly for a baby walker or stroller. The wheel assembly includes a wheel seat 6' having a semi-ball like body 62' with an axle hole 63' therein and a tube 61' extended upward therefrom. A tubular connecting member 8' is mounted around the tube 61' and a connecting post 7' is extended through the tubular connecting member 8'. The tubular connecting member 8' further includes outer threading (not labeled) for engaging with a frame of the baby walker or stroller. Thus, the wheel seat 6' is rotatable through 360° relative to the frame of the baby walker or stroller. A larger semi-ball like wheel 9' is mounted to a side of the wheel seat 6' and an axle 92' is extended through the axle hole 63' in the wheel seat 6' and an axle hole 93' of the wheel 9'. The wheel 9' includes a wheel rim 91' having a diameter larger than that of the body 62' and in contact with ground for rolling.

Nevertheless, dust and/or alien objects also tend to enter the exposed axle holes 93' and 63' of this wheel assembly such that friction to the axle 92' is increased. As a result, the wheel 9' may not rotate smoothly. The exposed ends of the axle 92' adversely affect the aesthetically pleasing effect. In addition, it is possible for the child in the baby walker or stroller to move to a dangerous place and thus gets hurt if adult is not aware of the situation, as the wheel 9' is not shielded. Furthermore, the baby or child may reach his/her fingers or toes into a space between the wheel 9' and the body 62' and thus be injured.

The present invention is intended to provide an improved wheel assembly that mitigates and/or obviates the above problems.

SUMMARY OF THE INVENTION

It is a primary object of the present invention to provide an improved wheel assembly for a child's wheeled gear (e.g., a baby walker or stroller) having an almost completely hidden wheel to avoid entry of dust or alien objects into the axle and to provide an aesthetically pleasing effect.

It is another object of the present invention to provide an improved wheel assembly for a baby walker or stroller having a stop so as to be easily stopped by a short obstacle to prevent potential injury to the child in the baby walker or stroller.

In accordance with one aspect of the invention, a wheel assembly for a child's wheeled gear comprises:

an upper shield comprising a connecting means adapted to be connected to a frame of the child's wheeled gear, thereby allowing the upper shield to rotate relative to the frame, the upper shield further comprising two opposite walls defining an upper compartment therebetween, the opposite walls including a pair of aligned axle receiving holes, a lower shield connected to the upper shield, the lower shield comprising a lower compartment that aligns with the upper compartment, a wheel rotatably received in the upper compartment and a lower compartment and having a lower end extended beyond the lower compartment, the wheel including an axle hole, and an axle extended through the axle hole of the wheel and the axle receiving holes of the upper shield, wherein the upper shield and the lower shield cover the axle hole of the wheel and the axle to prevent entrance of alien objects.

In accordance with a second aspect of the invention, a wheel assembly for a child's wheeled gear comprises:

an upper shield comprising a connecting means adapted to be connected to a frame of the child's wheeled gear, thereby allowing the upper shield to rotate relative to the frame, the upper shield further comprising an upper compartment, a lower shield connected to the upper shield, the lower shield comprising two opposite walls defining a lower compartment therebetween, the lower compartment being aligned with the upper compartment, the opposite walls of the lower shield including a pair of aligned axle receiving holes, a wheel rotatably received in the upper compartment and a lower compartment and having a lower end extended beyond the lower compartment, the wheel including an axle hole, and an axle extended through the axle hole of the wheel and the axle receiving holes of the lower shield, wherein the upper shield and the lower shield cover the axle hole of the wheel and the axle to prevent entrance of alien objects.

The upper shield further comprises at least one positioning hole and the lower shield further comprises at least one positioning peg for engaging with said at least one positioning hole.

The upper shield further comprises a first engaging ledge on a lower end thereof and the lower shield further comprises a second engaging ledge on an upper end thereof for engaging with the first engaging ledge.

The upper shield further comprises at least one upper engaging hole therein and the lower shield further comprises at least one lower engaging hole aligned with said at least one upper engaging hole, and further comprising at least one screw extended through said at least one lower engaging hole and said at least one upper engaging hole.

At least one of the upper shield and the lower shield comprises a plurality of reinforcing ribs. The lower shield further comprises a stop on an outer periphery thereof so as to be stopped by an obstacle when desired.

Each axle receiving hole includes an access having a width slightly smaller than a diameter of the axle, thereby allowing the axle to be forcibly inserted into the axle receiving hole via the access.

The upper or lower shield further comprises a second pair of aligned axle receiving holes at a level different from that of the first-mentioned pair of axle receiving holes for optional engagement of the axle to one of the first pair of axle receiving holes and the second pair of the axle receiving holes.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
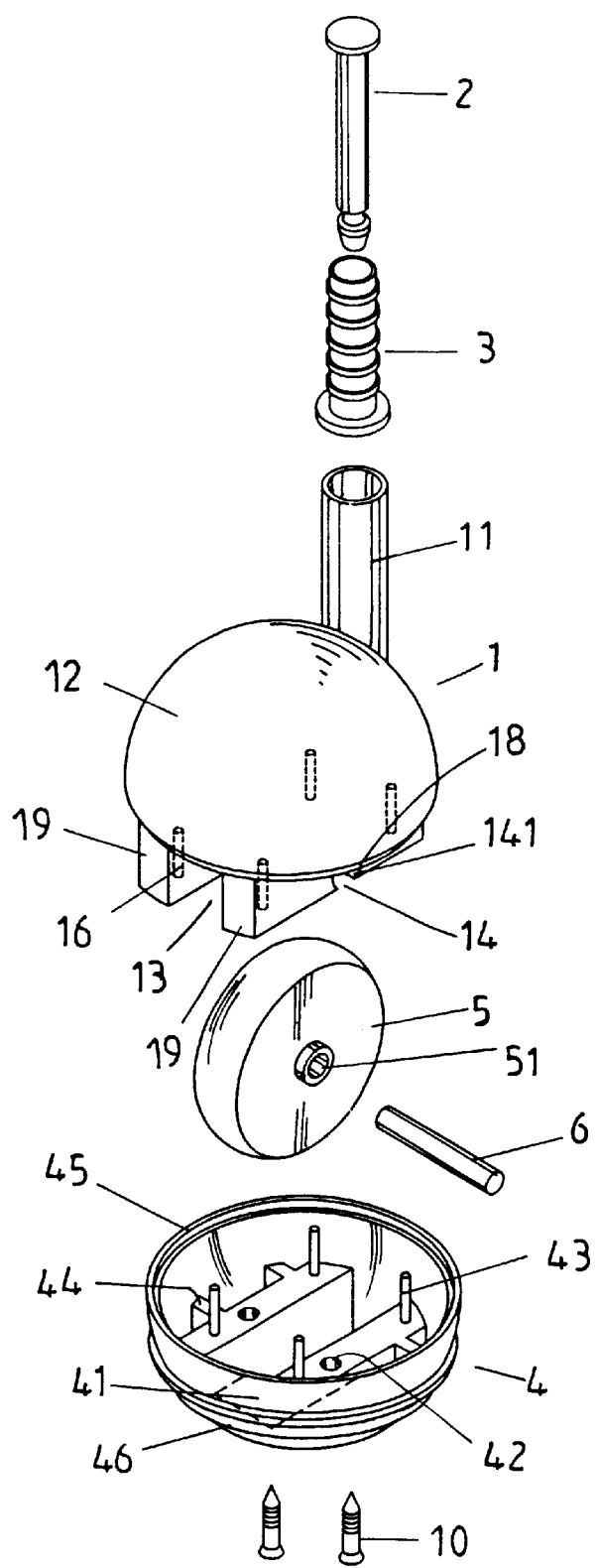
FIG. 1 is n exploded perspective view of a wheel assembly for a baby walker or stroller in accordance with the present invention.
Figure 2:
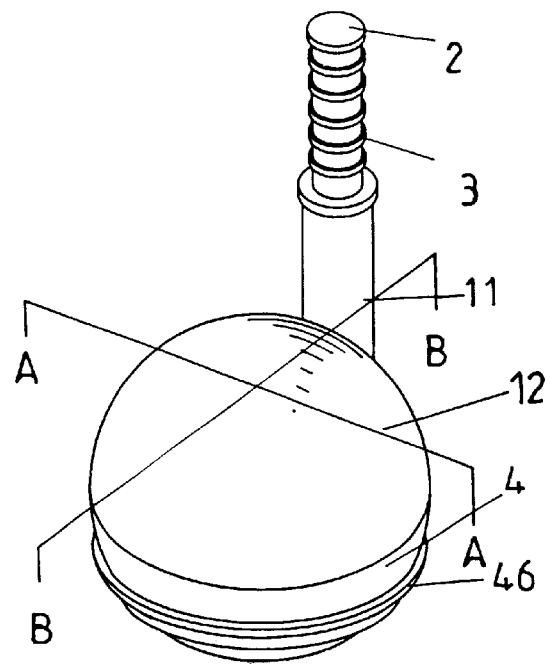
FIG. 2 is a perspective view of the wheel assembly in accordance with the present invention.

Referring to FIGS. 1 through 9 and initially to FIGS. 1 through 4, a wheel assembly fora child's wheeled gear (e.g., a baby walker or stroller) in accordance with the present invention generally includes a wheel seat 1 comprising an upper shield 12 and a lower shield 4. A tube 11 extends upwardly from the upper shield 12. A tubular connecting member 3 is mounted around the tube 11 and a connecting post 2 is extended through a longitudinal hole (not labeled) of the tubular connecting member 3. The tubular connecting member 3 further includes outer threading (not labeled) for engaging with a frame (not shown) of the baby walker (not shown) or stroller (not shown). Thus, the wheel seat 1 is rotatable through 360° relative to the frame of the baby walker or stroller.

Figure 3:
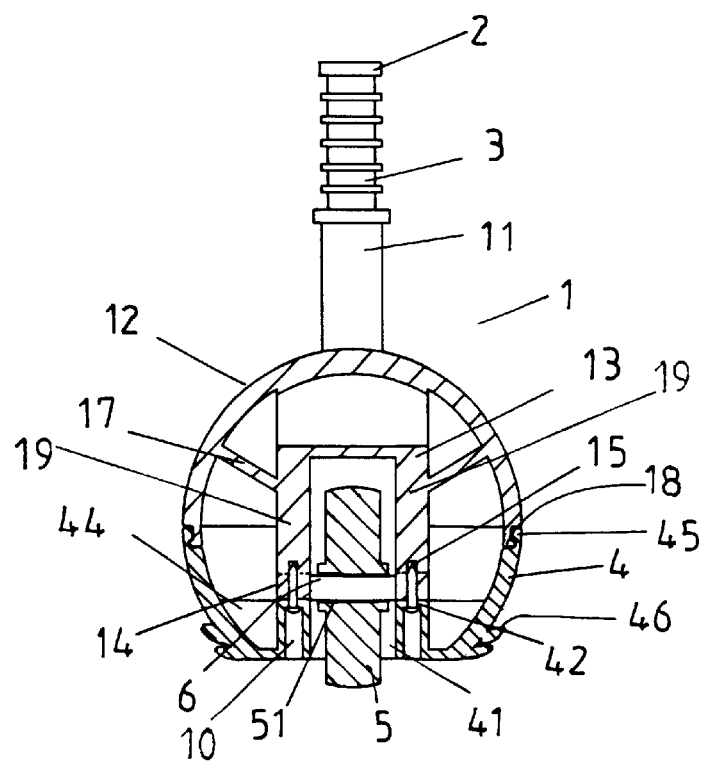
FIG. 3 is a sectional view taken along line 3—3 in FIG. 2.
Figure 4:
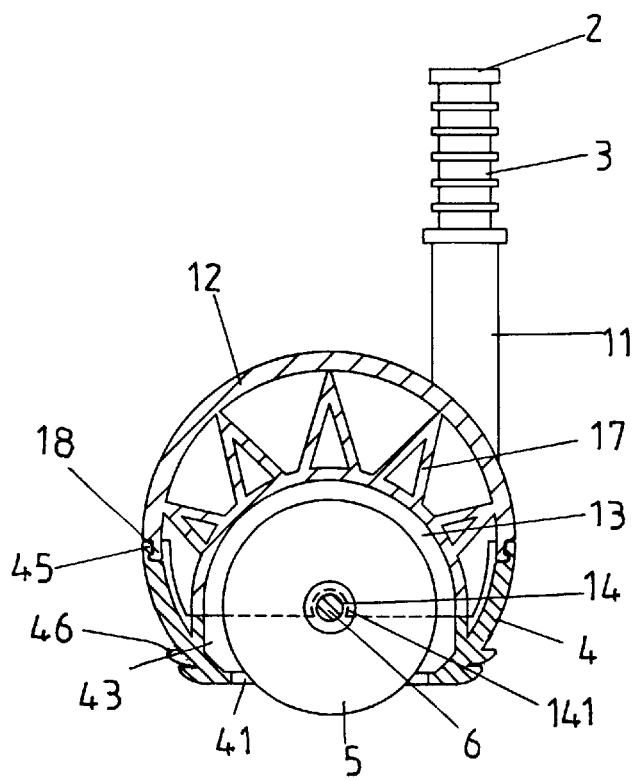
FIG. 4 is a sectional view taken along line 4—4 in FIG. 2.

The upper shield 12 includes a wheel receiving compartment 13 defined between two opposite walls 19 that have aligned axle holes 14. The compartment 13 is adapted to receive an upper portion of a wheel 5. Each wall 19 includes an axle receiving hole 14 with an access 141 having a width slightly smaller than the diameter of an axle 6, thereby allowing the axle 6 to be forcibly inserted into the axle receiving holes 14 via the accesses 141. The upper shield 12 includes a number of engaging holes 15 (FIG. 3) for engaging with the lower shield 4, which will be described later. The upper shield 12 further includes a number of positioning holes 16 (FIG. 1) and reinforcing ribs 17 (FIG. 3). Formed on a lower end edge of the upper shield 12 is an engaging ledge 18.

The lower shield 4 includes a width wider than the diameter of the wheel 5. Formed in a lower end of the lower shield 4 is a wheel receiving compartment 41 that has a width greater than that of the wheel 5. A lower end of the wheel 4 extends beyond the lower shield 4 and thus may roll on the ground (FIG. 3). The lower shield 4 further includes a number of engaging holes 42 (FIG. 3) aligned with the engaging holes 15 of the upper shield 12, and screws 10 are extended into the engaging holes 15 and 42 to secure the upper shield 12 and the lower shield 4 together. The lower shield 4 further includes a number of positioning pegs 43 (FIG. 1) for engaging with the positioning holes 16 of the upper shield 4, thereby providing a securer engagement therebetween. The lower shield 4 further includes a number of reinforcing ribs 44 (FIG. 1). In addition, the lower shield 4 includes an engaging ledge 45 (FIGS. 1 and 3) complimentary to the engaging ledge 18 of the upper shield 12, thereby providing a fitting engagement therebetween, The lower shield 4 further includes a stop 46 (preferably annular) on an outer periphery thereof.

The wheel 5 includes an axle hole 51 (FIG. 1) through which the axle 6 extends. The wheel 5 is rotatably mounted in the compartments 13 and 41 by means of engaging the axle 6 with the axle receiving holes 14 of the upper shield 12.

In assembly, the axle 6 is extended through the axle hole 5 of the wheel 5. Next, two ends of the axle 6 are forcibly inserted into the axle receiving holes 14 via the accesses 141, respectively, thereby rotatably mounted the wheel 5 and the axle 6 to the upper shield 12. The lower shield 4 is then attached to a bottom of the upper shield 12 with the positioning pegs 43 engaged in the positioning holes 16 and with the engaging ledge 18 engaged with the engaging ledge 45. In addition, screws 10 are inserted into the holes 42 and 15 to securely connect the lower shield 4 with the upper shield 12, while allowing the lower portion of the wheel 5 beyond the compartment 41 for rolling on the ground.

Thus, the axle hole 51 of the wheel 5 and the axle 6 are covered by the upper and lower shields 12 and 4 (FIG. 2), thereby preventing entrance of alien objects or dust that may affect smooth rotation of the wheel 5. In addition, the upper and lower shields 12 and 4 cover all of the components and thus provide an aesthetically pleasing effect, while avoiding potential injury to children by means of preventing access of children's toes or fingers into the upper and lower shield 12 and 4.

Figure 5:
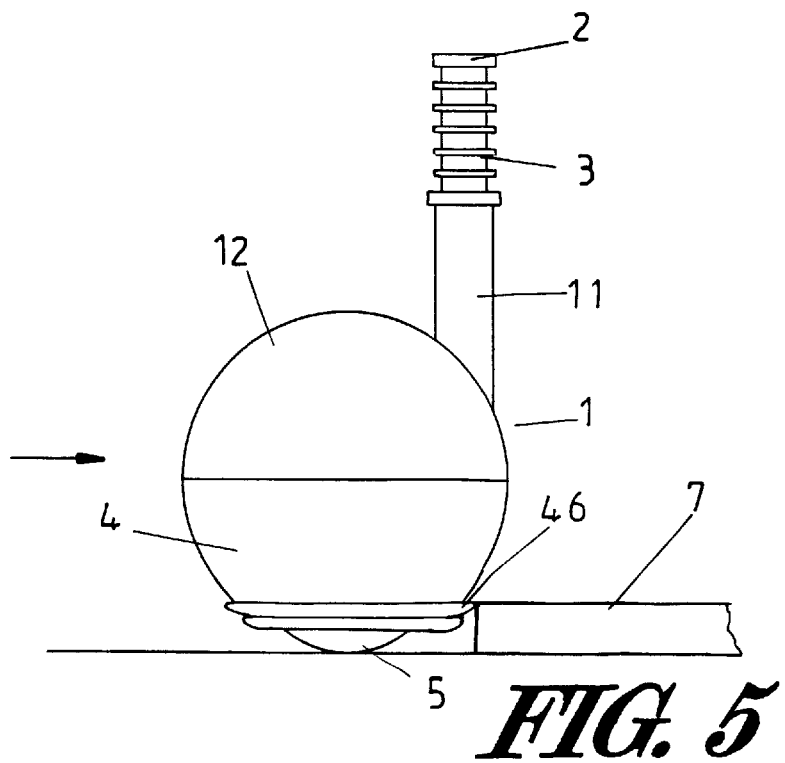
FIG. 5 is a side view illustrating operation of the stop of the wheel assembly.
Figure 6:
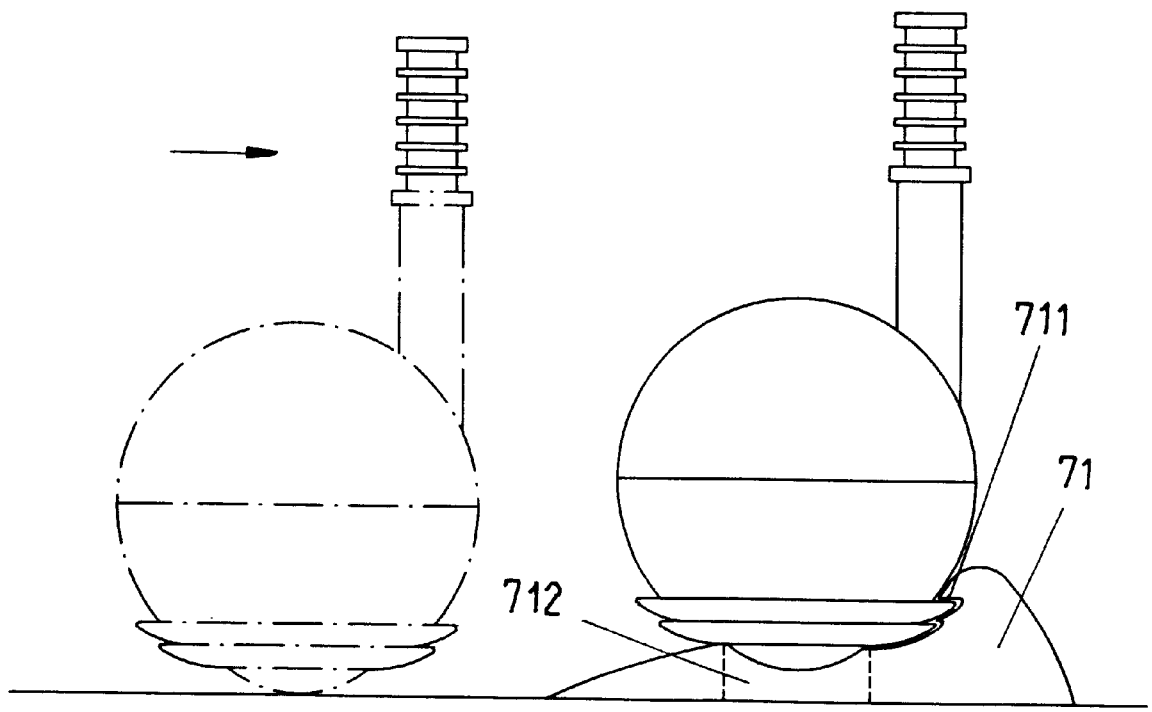
FIG. 6 is a schematic side view illustrating a tie-up member for the wheel assembly.

Referring to FIG. 5, when the wheel assembly of the invention is attached to a baby walker (not shown) or stroller (not shown) and rolls on the ground, only a small portion of the wheel 5 is exposed. Thus, an adult may easily find an obstacle 7 that is higher than the height of the exposed portion of the wheel 5 to thereby limit movement of the wheel 5. The obstacle 7 may be placed to the access to the topmost one of stairs or similar location. Thus, the baby walker or stroller can be stopped easily if desired, thereby preventing potential injury to the child in the baby walker or stroller. Referring to FIG. 6, the obstacle 71 may include a tie-up member 711 for engaging with the stop 46. The obstacle 71 may further include a trough 712 for receiving and thus elevating the wheel 5, thereby stopping movement of the wheel 5 in the forwarding direction. The wheel 5 may slide along the slope of the obstacle 71 back to the ground in the reverse direction for continuous movement.

Figure 7:
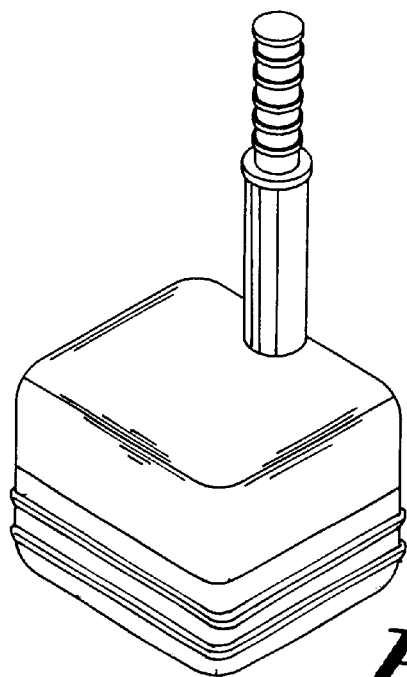
FIG. 7 is a perspective view of a modified embodiment of the wheel assembly in accordance with the present invention.
Figure 8:
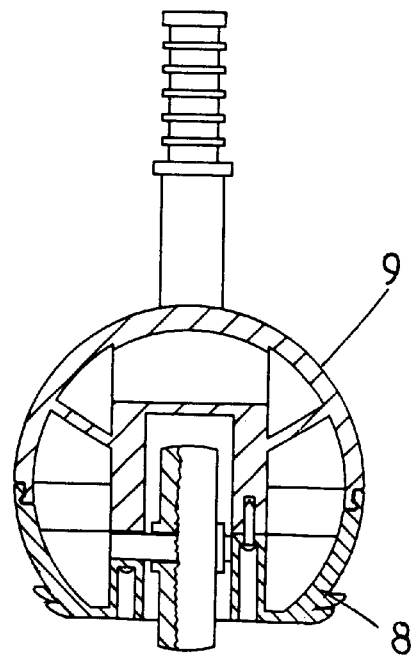
FIG. 8 is a sectional view taken along line 3—3 in FIG. 2 showing another embodiment of the internal structure of the wheel assembly in accordance with the present invention.
Figure 9:
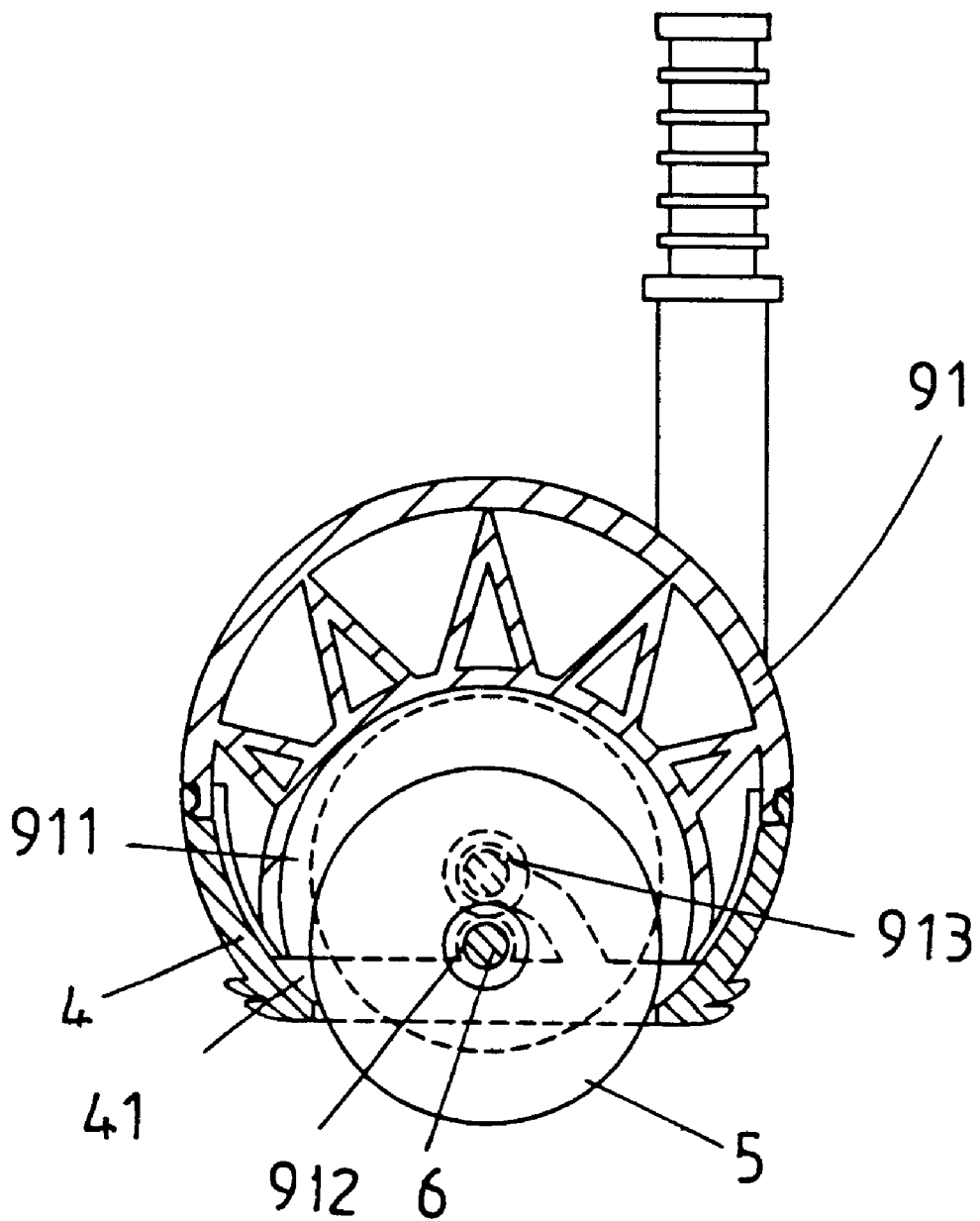
FIG. 9 is a sectional view taken along line 4—4 in FIG. 2 showing still another embodiment of the internal structure of the wheel assembly in accordance with the present invention.
Figure 10:
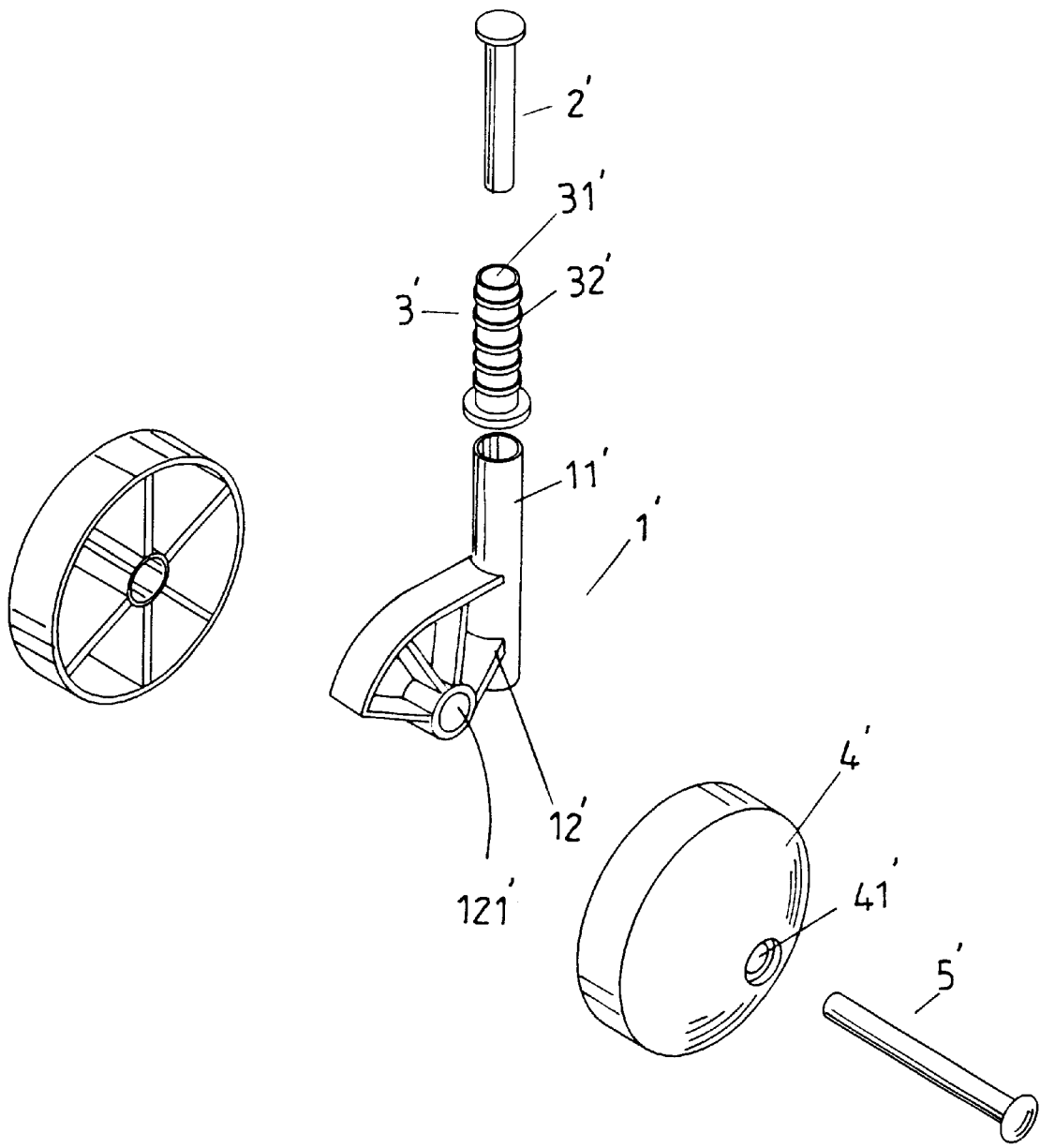
FIG. 10 is an exploded perspective view of a conventional wheel assembly for a baby walker or stroller
Figure 11:
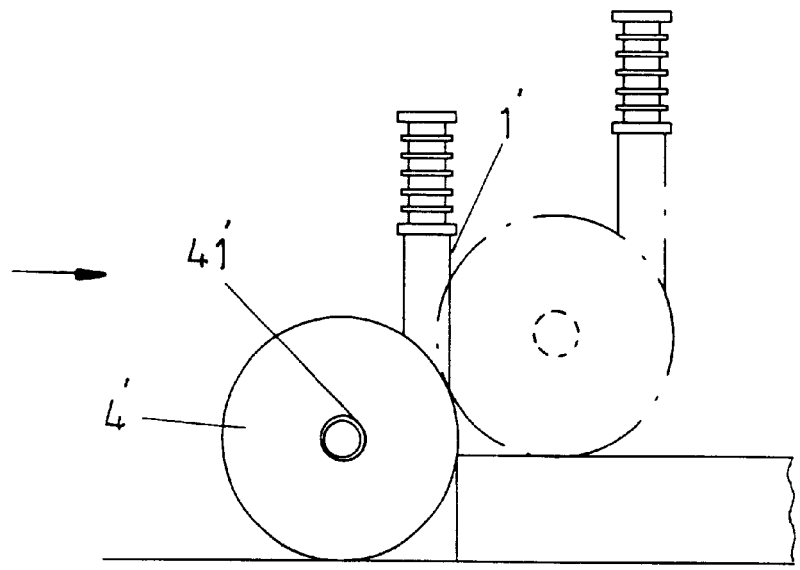
FIG. 11 is a side view illustrating movement of the conventional wheel assembly in FIG. 10.
Figure 12:
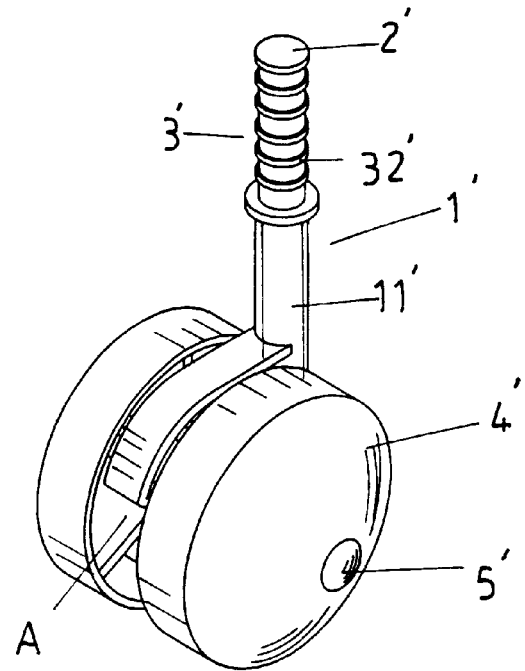
FIG. 12 is a perspective view of the conventional wheel assembly in FIG. 10.
Figure 13:
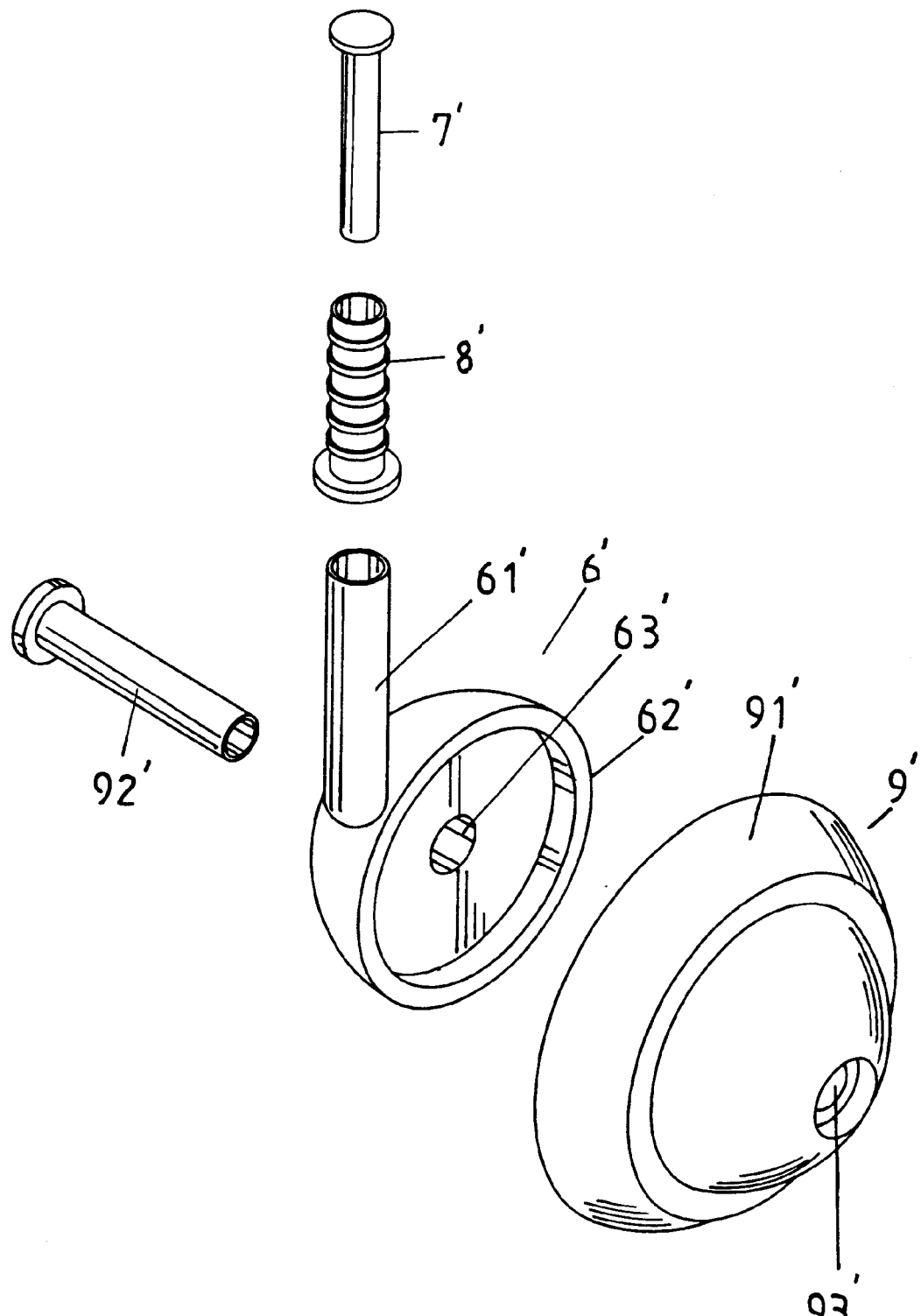
FIG. 13 is an exploded perspective view of another conventional wheel assembly for a baby walker or stroller.

FIG. 7 illustrates a modified embodiment of the invention, wherein the upper and lower shields are rectangular rather than semi-spherical. FIG. 8 illustrates a further modified embodiment, wherein the wheel 5 and the axle 6 are mounted to the lower shield (now designated by 8) rather than the upper shield (now designated by 9). FIG. 9 illustrates a further modified embodiment, wherein the upper shield 91 includes two pairs of axle receiving holes 912 and 913 at different levels to allow adjustment of the exposed extent of the wheel 5. Thus, the wheel 5 can be adjusted to roll over a rugged road or smooth road.

According to the above description, it is appreciated that the wheel assembly in accordance with the present invention includes the following advantages when compared with a conventional one:

(1) the axle hole of the wheel and the axle are covered by the upper and lower shields, thereby preventing entrance of alien objects or dust that may affect smooth rotation of the wheel;

(2) the upper and lower shields covering the components provide an aesthetically pleasing effect, and potential injury to children is avoided by means of preventing access of children's toes or fingers into the upper and lower shields;

(3) a short obstacle may be used to stop the wheel, thereby providing improved safety while reducing walking inconvenience to adults;

(4) the upper and lower shields are securely connected by means of positioning holes/positioning pegs, engaging ledges, and screws, thereby providing a reliable engagement therebetween, while avoiding shifting of the axle receiving compartment in the lower shield toward the wheel edge; and (5) the exposed extent of the wheel may be adjusted to suit different road conditions.

Although the invention has been explained in relation to its preferred embodiment, it is to be understood that many other possible modifications and variations can be made without departing from the spirit and scope of the invention as hereinafter claimed.

What is claimed is:

1. A wheel assembly for a child's wheeled gear, comprising:

an upper shield including connecting means for pivotal connection to a frame of a child's wheeled gear to thereby allow the upper shield to rotate relative to the frame, the upper shield including a pair of spaced opposing walls defining an upper compartment therebetween, the pair of walls having a pair of aligned axle receiving holes formed therein;

a lower shield connected to the upper shield, the lower shield having a lower compartment formed therein and disposed in aligned relationship with the upper compartment and an annular stop extending from an outer periphery thereof and adapted to substantially prevent the wheel assembly from rolling past an obstacle;

a wheel having an axle hole formed therethrough and being rotatably received in the upper compartment and the lower compartment, the wheel having a portion thereof extending from the lower compartment external the lower shield; and, an axle passing through the axle hole of the wheel and engaged with the pair of axle receiving holes.

2. The assembly as recited in claim 1, where in the wheel assembly further comprises a wheel stop member, the wheel stop member having (a) a trough formed in an upper surface thereof for capturing therein the portion of the wheel extending from the lower compartment, and (b) a tie-up member extending therefrom and engaging the stop of the lower shield to prevent rolling of the wheel assembly.

3. A wheel assembly for a child's wheeled gear, comprising:

an upper shield including connecting means for pivotal connection to a frame of a child's wheeled gear to thereby allow the upper shield to rotate relative to the frame, the upper shield having an upper compartment formed therein;

a lower shield connected to the upper shield, the lower shield including a pair of spaced opposing walls defining a lower compartment therebetween, the lower compartment being disposed in aligned relationship with the upper compartment, the pair of walls having a pair of aligned first axle receiving holes and a pair of aligned second axle receiving holes respectively formed therein, the pair of second axle receiving holes being at a level different from that of the pair of first axle receiving holes, the lower shield having an annular stop extending from an outer periphery thereof and adapted to substantially prevent the wheel assembly from rolling past an obstacle;

a wheel having an axle hole formed therethrough and being rotatably received in the upper compartment and the lower compartment, the wheel having a portion thereof extending from the lower compartment external the lower shield; and, an axle passing through the axle hole of the wheel and selectively engaged with one of the pair of first axle receiving holes or the pair of second axle receiving holes for adjusting a size of the portion of the wheel extending from the lower compartment to accommodate different surface contours.

4. The assembly as recited in claim 3, where in the wheel assembly further includes a wheel stop member, the wheel stop member having (a) a trough formed in an upper surface thereof for capturing therein the portion of the wheel extending from the lower compartment, and (b) a tie-up member extending therefrom and engaging the stop of the lower shield to prevent rolling of the wheel assembly.

* * * * *